US012663972B2

(12) United States Patent　　　(10) Patent No.:　US 12,663,972 B2
Iwakawa　　　　　　　　　　　　　　(45) Date of Patent:　　Jun. 23, 2026

(54) COMPILING DEVICE AND METHOD FOR PERFORMANCE SPEED-UP OF A PROGRAM

(71) Applicant: NEC Corporation, Tokyo (JP)

(72) Inventor: Kento Iwakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 146 days.

(21) Appl. No.: 18/265,300

(22) PCT Filed: Nov. 17, 2021

(86) PCT No.: PCT/JP2021/042164
§ 371 (c)(1),
(2) Date: Jun. 5, 2023

(87) PCT Pub. No.: WO2022/130883
PCT Pub. Date: Jun. 23, 2022

(65) Prior Publication Data
US 2024/0053969 A1　　Feb. 15, 2024

(30) Foreign Application Priority Data
Dec. 14, 2020　(JP) ................................. 2020-206419

(51) Int. Cl.
*G06F 8/41*　　　　　(2018.01)
*G06F 9/30*　　　　　(2018.01)

(52) U.S. Cl.
CPC ......... *G06F 8/452* (2013.01); *G06F 9/30036* (2013.01)

(58) Field of Classification Search
None
See application file for complete search history.

(56) References Cited

U.S. PATENT DOCUMENTS 5,481,746 A　*　1/1996　Schiffleger .......... G06F 15/8084
　　　　　　　　　　　　　　　　　　　712/E9.034
6,550,059 B1 *　4/2003　Choe ...................... G06F 8/447
　　　　　　　　　　　　　　　　　　　717/149
(Continued)

FOREIGN PATENT DOCUMENTS

JP　　　H09-062654 A　　3/1997
JP　　　H11-066046 A　　8/1997
(Continued)

OTHER PUBLICATIONS

International Search Report for PCT Application No. PCT/JP2021/042164, mailed on Feb. 22, 2022.
(Continued)

*Primary Examiner* — Qing Chen
(74) *Attorney, Agent, or Firm* — Sughrue Mion, PLLC

(57) ABSTRACT

Provided are a compiling device, a compiling method, and a compiling program with which the speed of a program can be increased when a loop in a program includes an access to adjacent data. The compiling device includes: a loop analysis unit for determining whether vectorization of a loop in a source program is possible when an access to adjacent data is included in the loop; and a vectorization execution unit for generating an instruction for reading elements required for computation from a memory to a vector register when access to the adjacent data is included and the vectorization of the loop is possible.

10 Claims, 19 Drawing Sheets

(56)                    References Cited

U.S. PATENT DOCUMENTS

| | | | |
|---|---|---|---|
| 2004/0006667 A1* | 1/2004 | Bik | G06F 8/452 |
| | | | 711/100 |
| 2007/0233766 A1* | 10/2007 | Gschwind | G06F 9/3824 |
| | | | 712/E9.071 |
| 2008/0114970 A1* | 5/2008 | Colavin | G06F 9/3013 |
| | | | 712/E9.035 |
| 2018/0246722 A1* | 8/2018 | Plotnikov | G06F 9/30138 |
| 2018/0267799 A1* | 9/2018 | Quitzk | G06F 9/30036 |
| 2021/0042099 A1* | 2/2021 | Bhandari | G06F 8/433 |
| 2021/0294605 A1* | 9/2021 | Plotnikov | G06F 9/3838 |

FOREIGN PATENT DOCUMENTS

| | | |
|---|---|---|
| JP | 2000-048009 A | 2/2000 |
| JP | 2009-104494 A | 5/2009 |
| JP | 2013-182293 A | 9/2013 |

OTHER PUBLICATIONS

English translation of Written opinion for PCT Application No. PCT/JP2021/042164, mailed on Feb. 22, 2022.
Shigemune Kitawaki et al., "Language Processors and Support Tools for the SX-3 Series", NEC Technical Report, Feb. 28, 1992, vol. 45, No. 2, p. 59-70.

* cited by examiner

Fig. 1
INSTRUCTION FORMAT ———
vestl vx, vy, vz
1. REGISTER SPECIFIED BY Vy IS SHIFTED TO LEFT BY 1 ELEMENT AND IS SUBSTITUTED INTO Vx
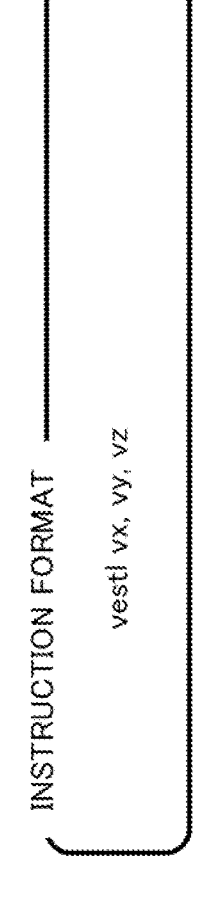
REGISTER Vy
REGISTER Vx
2. HEAD ELEMENT OF REGISTER SPECIFIED BY Vz IS COMBINED WITH LAST ELEMENT OF Vx
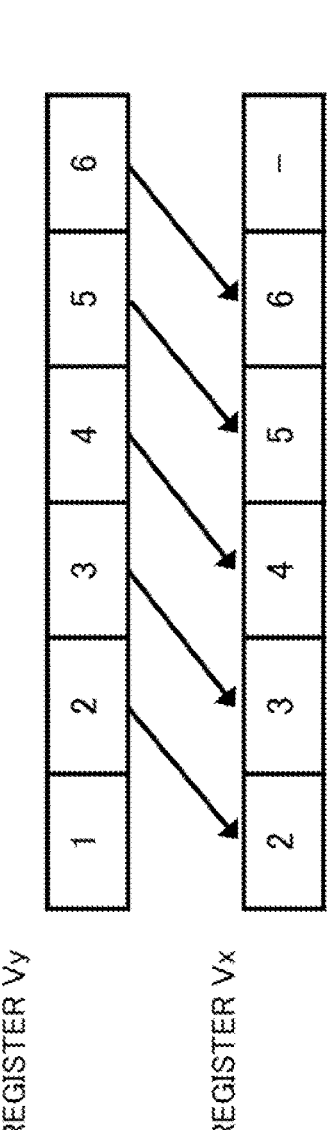
REGISTER Vz
REGISTER Vx

Fig. 4

```
INTEGER(KIND=8),   :: A(256), B(256)
DO I = 1, 256
  B(I) = A(I) + A(I+1) + A(I+2) + A(I+3) + A(I+4)
ENDDO
END
```

Fig. 6
GENERATE ADJACENT DATA A(I + 1) BY VECTOR ELEMENT SHIFT
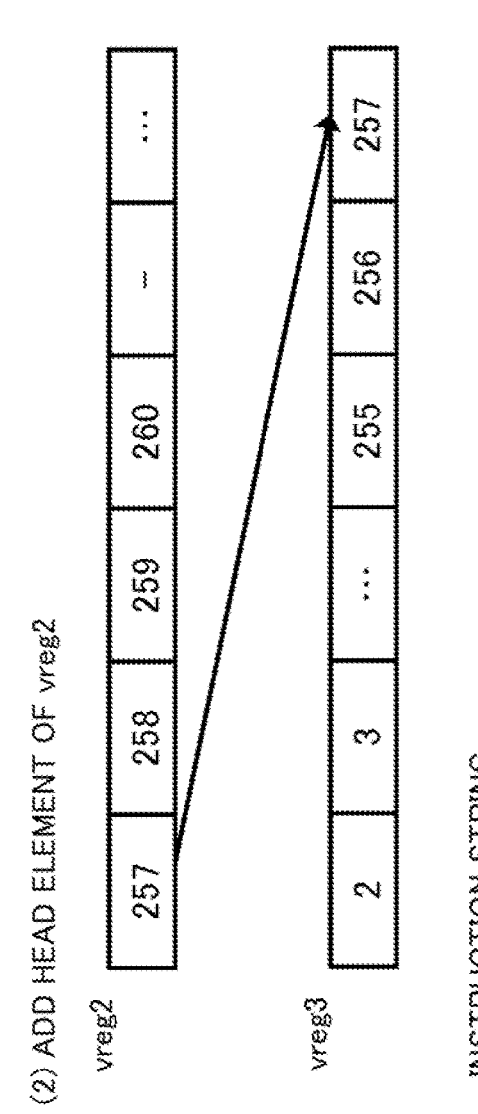
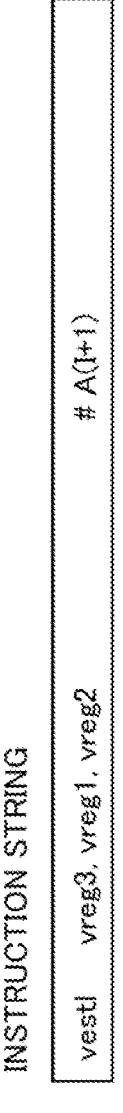
(1) SHIFT vreg1 TO LEFT BY 1 ELEMENT
vreg1
| 1 | 2 | 3 | ... | 255 | 256 |
vreg3
| 2 | 3 | ... | 255 | 256 | - |
(2) ADD HEAD ELEMENT OF vreg2
vreg2
| 257 | 258 | 259 | 260 | - | ... |
vreg3
| 2 | 3 | ... | 255 | 256 | 257 |
INSTRUCTION STRING
| vesti    vreg3, vreg1, vreg2 | # A(I+1) |

Fig. 7
GENERATE ADJACENT DATA A(I + 2) BY VECTOR ELEMENT SHIFT
(1) SHIFT vreg2 TO LEFT BY 1 ELEMENT TO SET HEAD ELEMENT TO 258
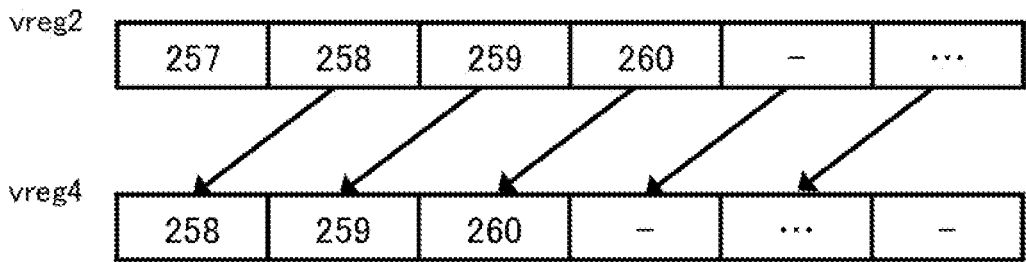
(2) SHIFT vreg1 TO LEFT BY 1 ELEMENT
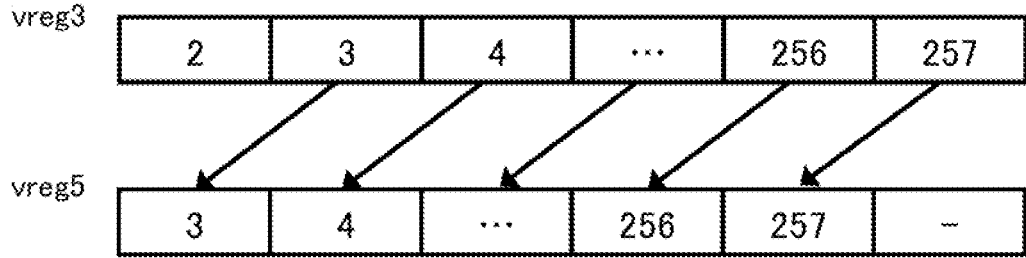
(3) ADD HEAD ELEMENT OF vreg2
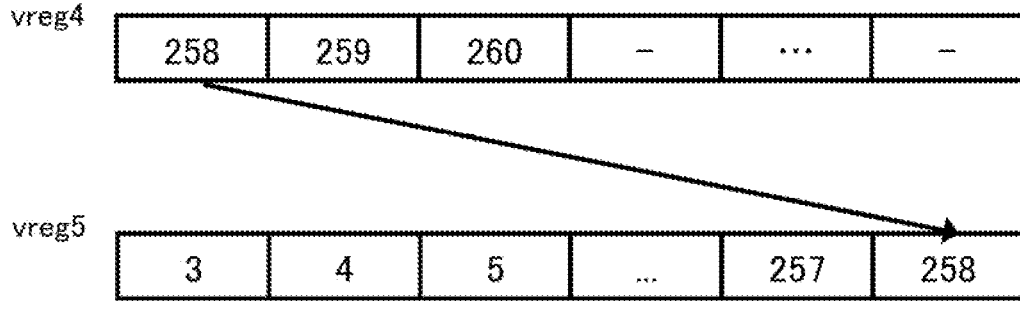
INSTRUCTION STRING
```
vestl    vreg4, vreg2, vreg2
vestl    vreg5, vreg3, vreg4   # A(I+2)
```

Fig. 8
GENERATE ADJACENT DATA A(I + 3) BY VECTOR ELEMENT SHIFT
(1) SHIFT vreg4 TO LEFT BY 1 ELEMENT TO SET HEAD ELEMENT TO 259
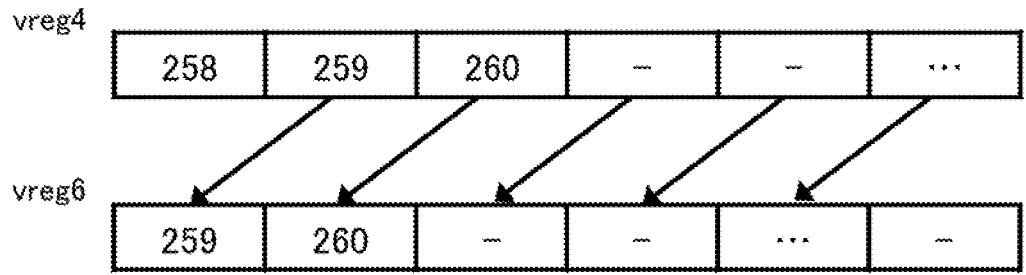
(2) SHIFT vreg5 TO LEFT BY 1 ELEMENT
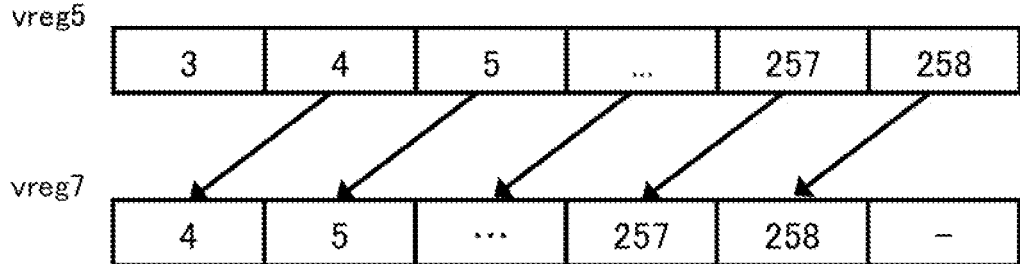
(3) ADD HEAD ELEMENT OF vreg6
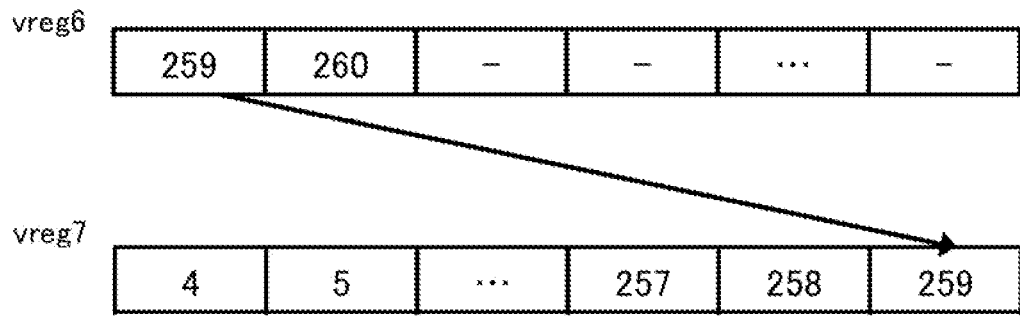
INSTRUCTION STRING
```
vestl    vreg6, vreg4, vreg4
vestl    vreg7, vreg5, vreg6   # A(I+3)
```

Fig. 9
GENERATE ADJACENT DATA A(I + 4) BY VECTOR ELEMENT SHIFT
(1) SHIFT vreg6 TO LEFT BY 1 ELEMENT TO SET HEAD ELEMENT TO 260
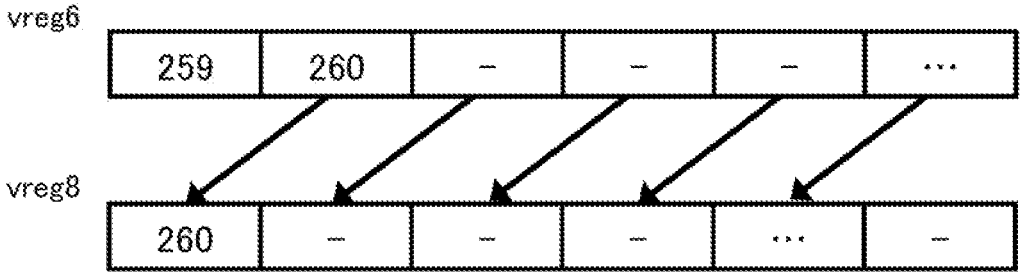
(2) SHIFT vreg7 TO LEFT BY 1 ELEMENT
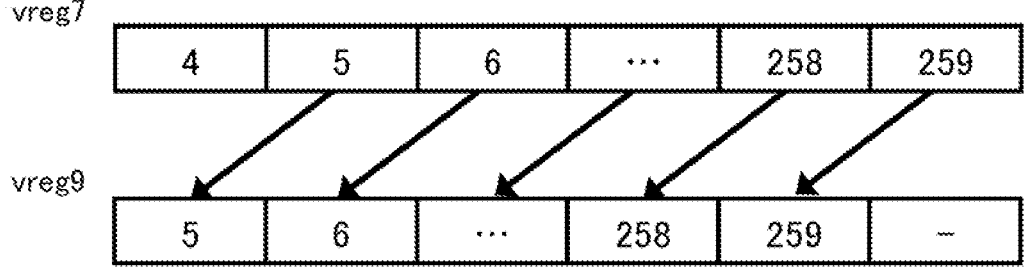
(3) ADD HEAD ELEMENT OF vreg8
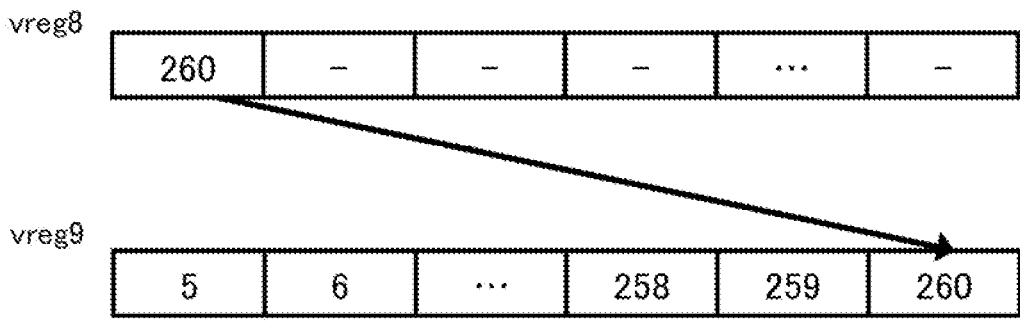
INSTRUCTION STRING
| vestl | vreg8, vreg6, vreg6 |
| vestl | vreg9, vreg7, vreg8  # A(I+4) |

VECTOR COMPUTATION

INSTRUCTION STRING

```
vadd    vreg10, vreg1,  vreg3  # A(I)+A(I+1)
vadd    vreg10, vreg10, vreg5  #    +A(I+2)
vadd    vreg10, vreg10, vreg7  #    +A(I+3)
vadd    vreg10, vreg10, vreg9  #    +A(I+4)
```

Fig. 12A

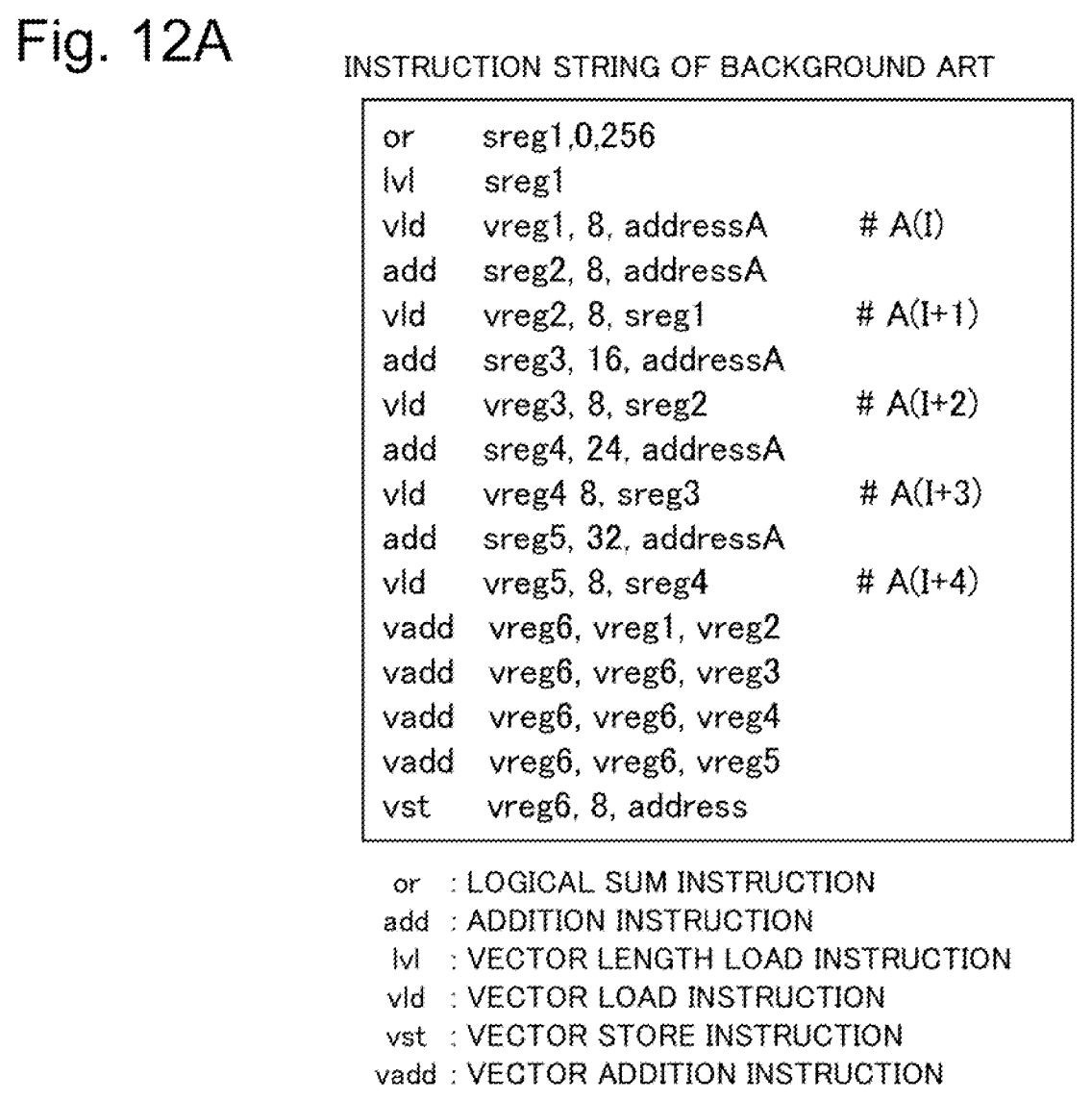

INSTRUCTION STRING OF BACKGROUND ART

```
or    sreg1,0,256
lvl   sreg1
vld   vreg1, 8, addressA      # A(I)
add   sreg2, 8, addressA
vld   vreg2, 8, sreg1         # A(I+1)
add   sreg3, 16, addressA
vld   vreg3, 8, sreg2         # A(I+2)
add   sreg4, 24, addressA
vld   vreg4 8, sreg3          # A(I+3)
add   sreg5, 32, addressA
vld   vreg5, 8, sreg4         # A(I+4)
vadd  vreg6, vreg1, vreg2
vadd  vreg6, vreg6, vreg3
vadd  vreg6, vreg6, vreg4
vadd  vreg6, vreg6, vreg5
vst   vreg6, 8, address
```

```
or    : LOGICAL SUM INSTRUCTION
add   : ADDITION INSTRUCTION
lvl   : VECTOR LENGTH LOAD INSTRUCTION
vld   : VECTOR LOAD INSTRUCTION
vst   : VECTOR STORE INSTRUCTION
vadd  : VECTOR ADDITION INSTRUCTION
```

Fig. 12B

INSTRUCTION STRING OF EMBODIMENT

```
or      sreg1,0,256
lvl     sreg1
vld     vreg1, 8, addressA        # A(I)
or      sreg2, 4
lvl     sreg2
add     sreg3, 8*256, addressA
vld     vreg2, 8, sreg3
lvl     sreg1
vestl   vreg3, vreg1, vreg2        # A(I+1)
vestl   vreg4, vreg2, vreg2
vestl   vreg5, vreg3, vreg4        # A(I+2)
vestl   vreg6, vreg4, vreg4
vestl   vreg7, vreg5, vreg6        # A(I+3)
vestl   vreg8, vreg6, vreg6
vestl   vreg9, vreg7, vreg8        # A(I+4)
vadd    vreg10, vreg1,  vreg3
vadd    vreg10, vreg10, vreg5
vadd    vreg10, vreg10, vreg7
vadd    vreg10, vreg10, vreg9
vst     vreg10, 8, addressB
```

```
  or    : LOGICAL SUM INSTRUCTION
 add    : ADDITION INSTRUCTION
 lvl    : VECTOR LENGTH LOAD INSTRUCTION
 vld    : VECTOR LOAD INSTRUCTION
 vst    : VECTOR STORE INSTRUCTION
vadd    : VECTOR ADDITION INSTRUCTION
vestl   : VECTOR ELEMENT SHIFT INSTRUCTION
```

Fig. 13

```
INTEGER(KIND=8), :: A(256), B(256)
DO I = 1, 256
  B(I) = A(I) + A(I+3) + A(I+4) + A(I+7) + A(I+10)
ENDDO
END
```

Fig. 14
INSTRUCTION FORMAT
vestl vx, vy, vz, sx
1. REGISTER SPECIFIED BY Vy IS SHIFTED TO LEFT ONLY BY VALUE OF REGISTER SPECIFIED BY Sx AND IS SUBSTITUTED INTO Vx
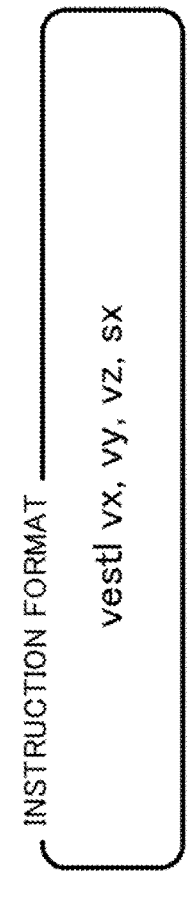
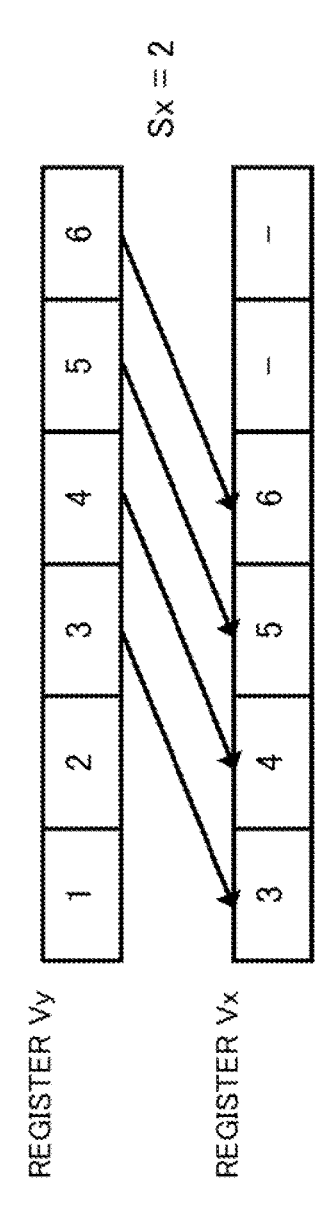
2. Sx HEAD ELEMENTS OF REGISTER SPECIFIED BY Vz IS COMBINED WITH LAST ELEMENT OF Vx
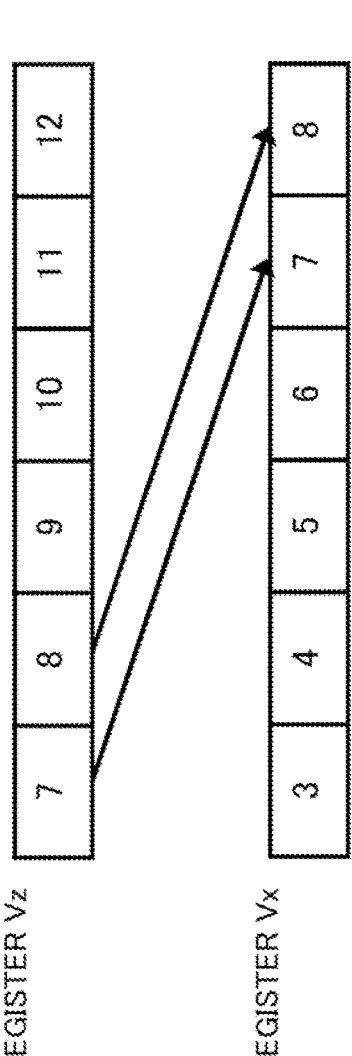

Fig. 15

```
INTEGER(KIND=8), :: A(256), B(256)
DO I = 5, 260
    B(I) = A(I) + A(I-1) + A(I-2) + A(I-3) + A(I-4)
ENDDO
END
```

Fig. 16
INSTRUCTION FORMAT
vestr vx, vy, vz
1.  REGISTER SPECIFIED BY Vy IS SHIFTED TO RIGHT ONLY BY 1 ELEMENT AND IS SUBSTITUTED INTO Vx
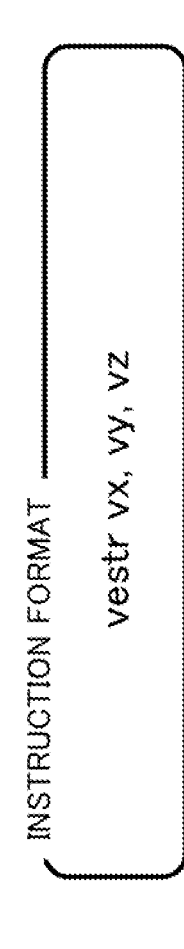
REGISTER Vy
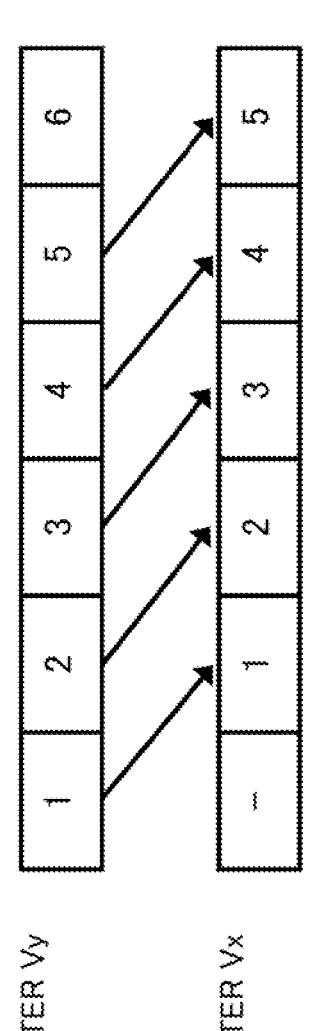
REGISTER Vx
2.  HEAD ELEMENT OF REGISTER SPECIFIED BY Vz IS COMBINED WITH HEAD ELEMENT OF Vx
REGISTER Vz
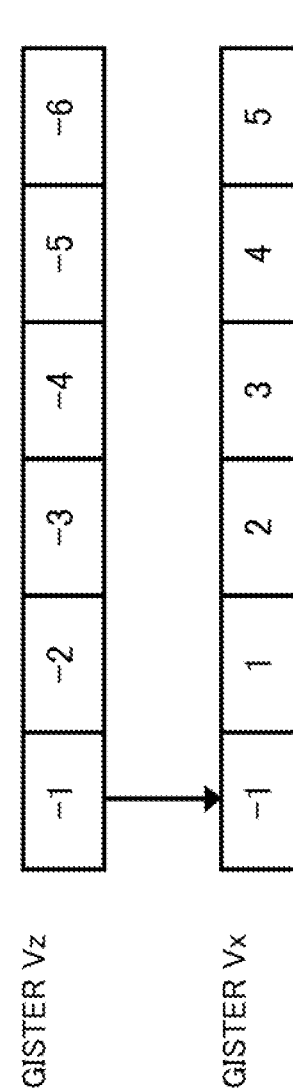
REGISTER Vx

Fig. 17

(a) COMPUTATION WITH ADJACENT ACCESS

```
INTEGER(KIND=8), :: A(256), B(256)
DO I = 1, 256
  B(I) = A(I) + A(I+1) + A(I+2) + A(I+3) + A(I+4)
ENDDO
END
```

COMPILE (b) GENERATED INSTRUCTION STRING

```
or    sreg1,0,256
lvl   sreg1
vld   vreg1, 8, addressA       # A(I)
add   sreg2, 8, addressA
vld   vreg2, 8, sreg1          # A(I+1)
add   sreg3, 16, addressA
vld   vreg3, 8, sreg2          # A(I+2)
add   sreg4, 24, addressA
vld   vreg4, 8, sreg3          # A(I+3)
add   sreg5, 32, addressA
vld   vreg5, 8, sreg4          # A(I+4)
vadd  vreg6, vreg1, vreg2
vadd  vreg6, vreg6, vreg3
vadd  vreg6, vreg6, vreg4
vadd  vreg6, vreg6, vreg5
vst   vreg6, 8, address
``` or    : LOGICAL SUM INSTRUCTION
add   : ADDITION INSTRUCTION
lvl   : VECTOR LENGTH LOAD INSTRUCTION
vld   : VECTOR LOAD INSTRUCTION
vst   : VECTOR STORE INSTRUCTION
vadd  : VECTOR ADDITION INSTRUCTION

COMPILING DEVICE AND METHOD FOR PERFORMANCE SPEED-UP OF A PROGRAM

This application is a National Stage Entry of PCT/JP2021/042164 filed on Nov. 17, 2021, which claims priority from Japanese Patent Application 2020-206419 filed on Dec. 14, 2020, the contents of all of which are incorporated herein by reference, in their entirety.

TECHNICAL FIELD

The present disclosure relates to a compiling device, a compiling method, and a compiling program recording medium, and particularly relates to speed-up of a program.

BACKGROUND ART

An access time from a computing device of a computer to a main memory is longer than the computing time of the computing device, and the data transfer performance between the main memory and the computing device is insufficient. In order to fill this widening performance difference, in general, in a scalar computer, a high-speed cache memory is provided between a computing device and a main memory to shorten an access time to the main memory. On the other hand, in the vector computer, the access time to the main memory is shortened by collectively transferring a large amount of data at a time by a vector instruction. The memory access time per piece of data can be regarded as one of the number of pieces of data transferred simultaneously. The maximum value of the number is determined by a vector length of the vector computer. When the vector length is 256, the memory access time is as small as 1/256.

In the vector computer, data arranged in the main memory is loaded onto a vector register, and high-speed computation is achieved via the vector register. Therefore, it is important to efficiently bring the data on the main memory onto the register for speeding up.

PTL 1 relates to a vector computer, and proposes to improve execution performance by reducing redundant memory accesses when there is an adjacent memory access instruction.

PTL 2 relates to a compiling method used in a computer, and proposes that an array in a source program is extracted and allocated to a main memory or a temporary storage device according to the number of accesses.

CITATION LIST

Patent Literature

PTL 1: JP 2000-048009 A
PTL 2: JP 2013-182293 A

SUMMARY

Technical Problem

However, the above-described background art compiling method has the following problems. In the background art compiling method, when computation on adjacent data is processed by a vector instruction as in the program illustrated in (a) of FIG. 17, a vector load instruction is generally issued to each of the array elements A(I) to A(I+4) as illustrated in (b) of FIG. 17.

However, when a vector load instruction is issued to each array element as illustrated in FIG. 17(b), the number of vector load instruction executions increases. In (b) of FIG. 17, an overlapping element is loaded between vector load instructions. Instructions with memory accesses, such as vector load instructions, are slower than instructions without memory accesses, and the loading of duplicate elements slows down the program.

In PTL 1, vector load instructions are reduced by shifting adjacent data elements. PTL 1 proposes that data at the end of a vector register is insufficient due to element shifting, but processing is executed by scalar computation or handling is performed without executing computation by a mask for the insufficient data by changing the vector length. For this reason, there is a problem that it is necessary to perform handling such as executing processing by scalar computation or not executing computation by mask for insufficient data by changing the vector length, and efficiency of operation execution is reduced.

An object of the present disclosure is to provide a compiling device, a compiling method, and a compiling program with which the speed of a program can be increased when a loop in a program includes an access to adjacent data.

Solution to Problem

In order to achieve the above object, there is provided a compiling device according to the present disclosure including: a loop analysis unit for determining whether vectorization of a loop in a source program is possible when an access to adjacent data is included in the loop; and a vectorization execution unit for generating an instruction for reading elements required for computation from a memory to a vector register when access to the adjacent data is included and the vectorization of the loop is possible.

A compiling method according to the present disclosure includes:

> when access to adjacent data is included in a loop of a source program, determining whether the loop can be vectorized;
> generating a vector load instruction to read an element required for computation from a memory into a vector register when access to the adjacent data is included and the loop is vectorizable;
> generating a vector element shift instruction that generates vector data obtained by shifting an element read into a vector register;
> generating a vector computation instruction for executing computation; and
> generating a vector store instruction to write a computation result from the vector register to a memory.

A compiling program recording medium according to the present disclosure having stored therein a compiling program causing a computer to execute:

> a loop analysis means configured to determine whether vectorization of a loop in a source program is possible when an access to adjacent data is included in the loop; and
> a vectorization execution means configured to generate an instruction for reading an element required for computation from a memory to a vector register when access to the adjacent data is included and the vectorization of the loop is possible.

Advantageous Effects of Disclosure

According to the present disclosure, it is possible to provide a compiling device, a compiling method, and a compiling program with which the speed of a program can be increased when a loop in a program includes an access to adjacent data.

BRIEF DESCRIPTION OF DRAWINGS

FIG. 1 is a conceptual diagram for explaining a compiling method according to an example embodiment of the present invention.

FIG. 4 is an example of a source program targeted by the first example embodiment of the present invention.

FIG. 6 is a conceptual diagram for explaining an operation of generating adjacent data A(I+1) by vector element shift in the compiling method according to the first example embodiment of the present invention.

FIG. 7 is a conceptual diagram for explaining an operation of generating adjacent data A(I+2) by vector element shift in the compiling method according to the first example embodiment of the present invention.

FIG. 8 is a conceptual diagram for explaining an operation of generating adjacent data A(I+3) by vector element shift in the compiling method according to the first example embodiment of the present invention.

FIG. 9 is a conceptual diagram for explaining an operation of generating adjacent data A(I+4) by vector element shift in the compiling method according to the first example embodiment of the present invention.

FIG. 12A is a view illustrating an instruction string generated by the background art.

FIG. 12B is a view illustrating an instruction string generated according to the exemplary example embodiment of the present invention.

FIG. 13 is an example of a source program targeted by a second example embodiment of the present invention.

FIG. 14 is a conceptual diagram for explaining a compiling method according to the second example embodiment of the present invention.

FIG. 15 is an example of a source program targeted by a third example embodiment of the present invention.

FIG. 16 is a conceptual diagram for explaining a compiling method according to the third example embodiment of the present invention.

FIG. 17(*a*) is a source program of computation involving adjacent access, and FIG. 17(*b*) is an instruction string generated by a compiling method of the background art.

EXAMPLE EMBODIMENT

Before describing specific example embodiments of the present invention, an outline of the example embodiments will be described.

In the example embodiment of the present invention, when a vector load instruction for loading adjacent data is included in the source program, the vector load instruction for loading the adjacent data is replaced with the vector element shift instruction illustrated in FIG. 1 without memory access, thereby speeding up the program.

Figure 5:
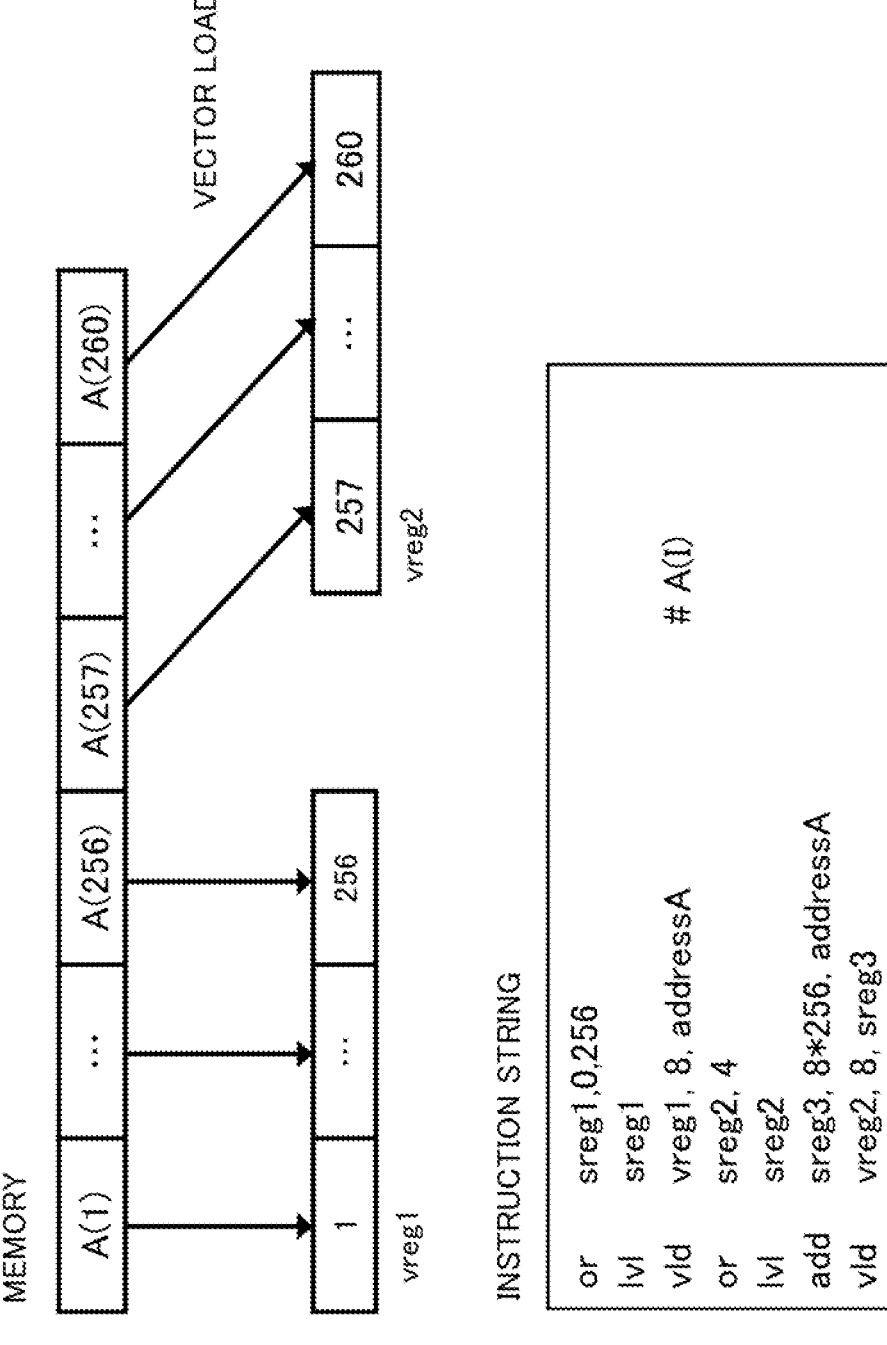
FIG. 5 is a conceptual diagram for explaining an operation of loading an element required for computation from a memory by vector loading in the compiling method according to the first example embodiment of the present invention.

As illustrated in FIG. 5, data required for computation is loaded into a vector register by the vector load instruction. Then, adjacent data elements are generated by shifting the elements of the vector register loaded with the data as illustrated in FIG. 6 by the vector element shift instruction.

By generating adjacent data elements by the vector element shift instruction, it is possible to eliminate overlapping data loading, and thus the number of vector load instructions to be executed can be reduced and the program can be speeded up.

The compiling device, the compiling method, and the compiling program of the example embodiment of the present invention are used in a computer that executes a target program (object program). Such a computer is a computer 150 illustrated in FIG. 2B, and includes a computing device 151, a main memory 152, and a temporary storage device 153. The computer 150 is a computer, and is a vector computer capable of vector computation. A computer having such a configuration is proposed in PTL 2.

Figure 2A:
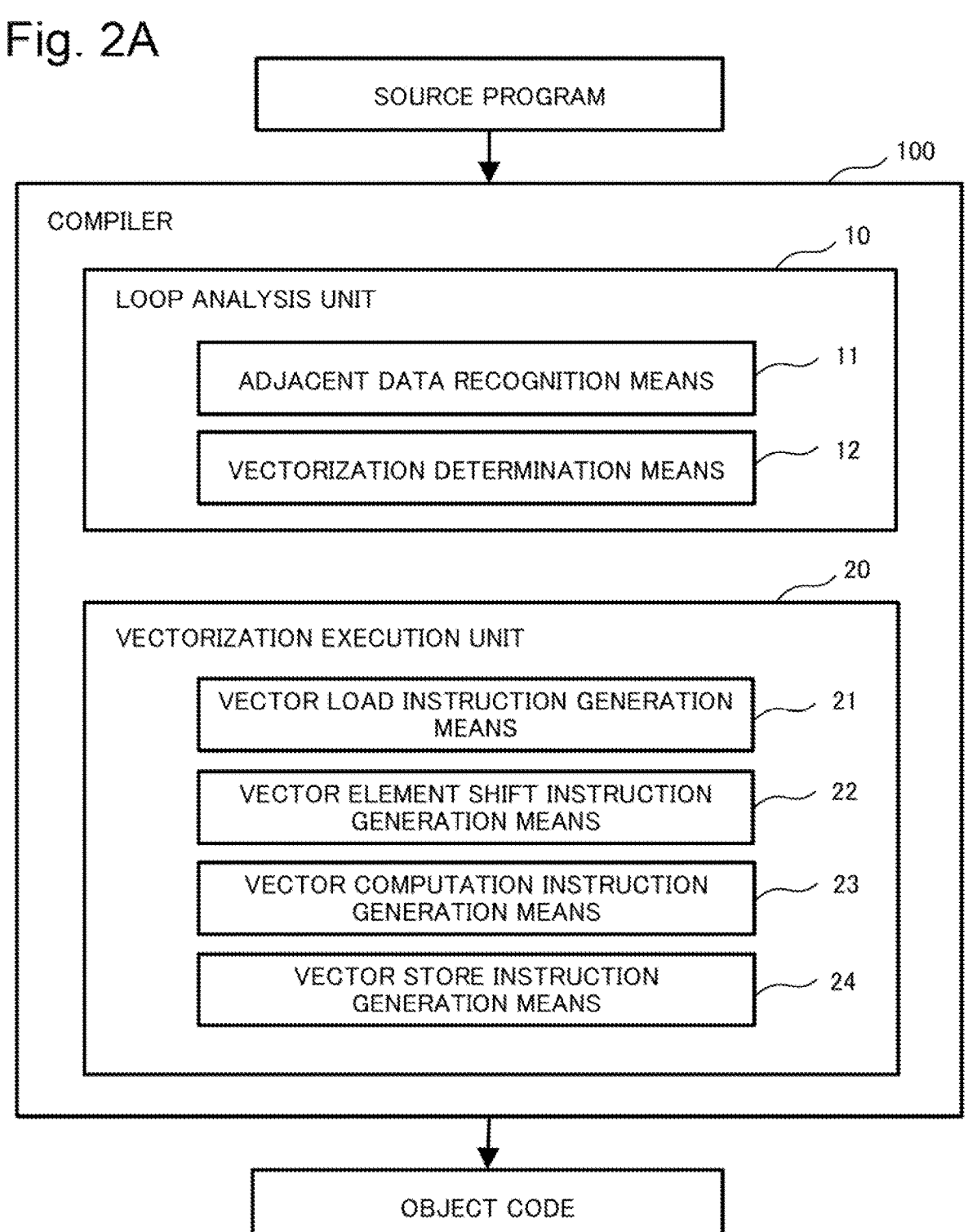
FIG. 2A is a block diagram for explaining a compiler according to a first example embodiment of the present invention.
Figure 2B:
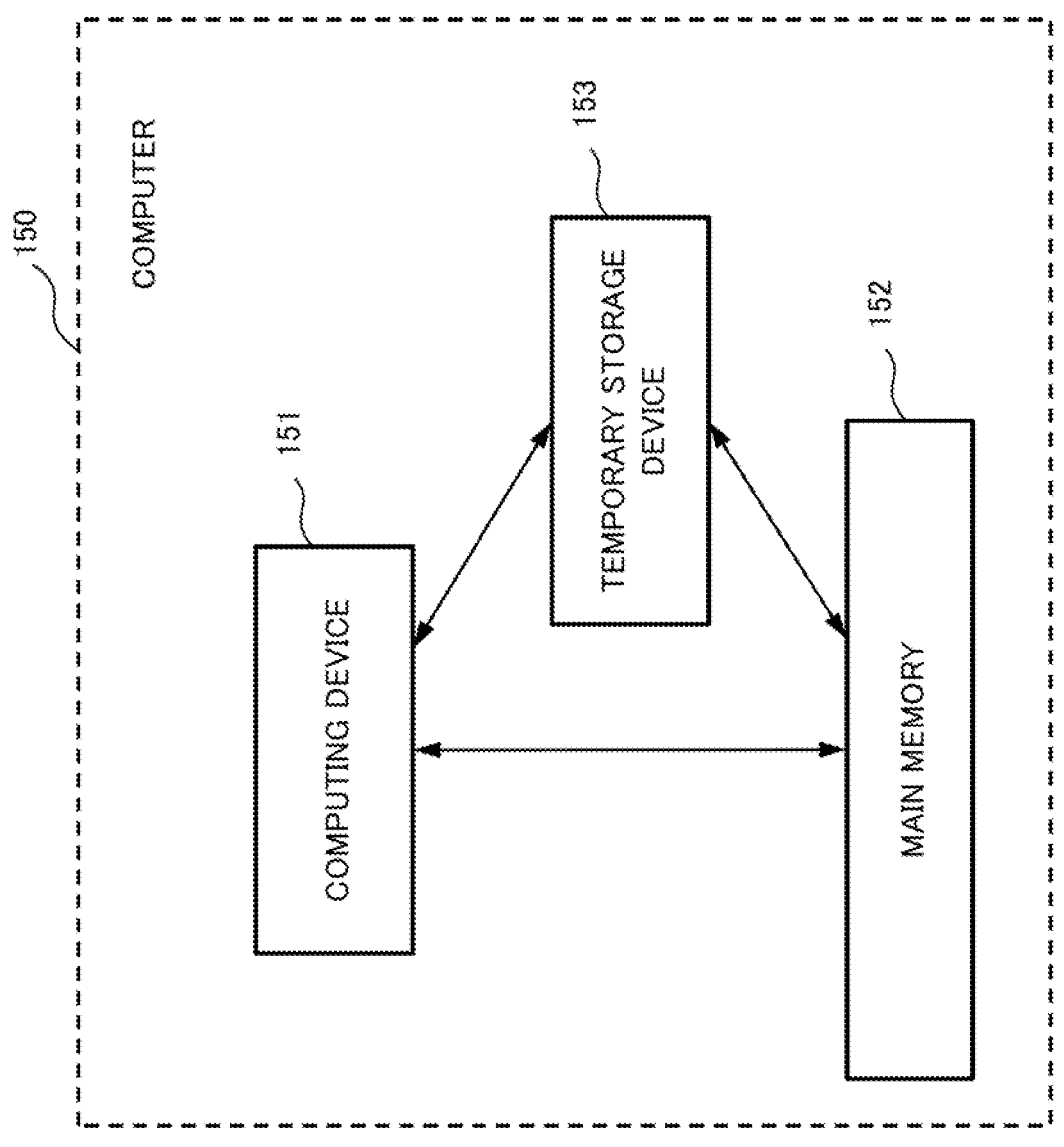
FIG. 2B is a block diagram for explaining a configuration of a computer that executes a target program with respect to the compiling device, the compiling method, and the compiling program according to the example embodiment of the present invention.

The computing device 151 in FIG. 2B is a device for the computer 150 to execute computation based on a program. Specifically, the computing device 151 is a computing device in a processor such as a central processing unit (CPU) or a graphics processing unit (GPU) of a computer, and includes, for example, an arithmetic logic unit (ALU) in the CPU. The computing device 151 acquires data from the main memory 152 or the temporary storage device 153, and executes computation accordingly.

The main memory 152 in FIG. 2B is a main storage device that can be accessed by the computing device 151 in the computer 150. The main memory 152 can hold data necessary for the computing device 151 to execute the computation and data as a result of executing the computation.

The temporary storage device 153 in FIG. 2B is a storage device that the computing device 151 can access at a higher speed than the main memory 152, and related to, for example, a register. For example, in a case where the computing device 151 and the temporary storage device 153 constitute a CPU, the computing device 151 is an ALU in the CPU, and the temporary storage device 153 is a register in the CPU.

The compiling device of the example embodiment of the present invention is a compiler that generates a target program executed by the computer 150 based on a source program. The compiler compiles the source program to generate an object code and generate a target program (object program). Hereinafter, specific example embodiments of the present invention will be described in detail with reference to the drawings.

First Example Embodiment

First, a compiling device, a compiling method, and a compiling program according to a first example embodiment of the present invention will be described.

Configuration of Example Embodiment

FIG. 2A is a block diagram for explaining the compiling device according to the present example embodiment. The compiling device of FIG. 2A is a compiler 100 that compiles a source program to generate an object code. The compiler 100 in FIG. 2A includes a loop analysis unit 10 that analyzes a source program as a program to analyze whether a loop in the program includes access to adjacent data and can be vectorized, and a vectorization execution unit 20 that vectorizes the loop based on an analysis result. The compiling device according to the present example embodiment is one function used in the above-described computer and incorporated in the compiler.

The loop analysis unit 10 includes an adjacent data recognition means 11 that recognizes whether access to adjacent data is included in a loop, and a vectorization determination means 12 that determines whether a loop including access to adjacent data can be vectorized.

The vectorization execution unit 20 includes a vector load instruction generation means 21 that reads an element necessary for computation from the memory to the vector register. Further, the vectorization execution unit 20 includes a vector element shift instruction generation means 22 that generates an instruction (vector element shift instruction) for computing vector data obtained by element shifting the element read into the vector register, and a vector computation instruction generation means 23 that executes computation. The vectorization execution unit 20 further includes a vector store instruction generation means 24 that writes the computation result from the vector register to the memory.

In the example embodiment of the present invention, it is assumed that the computer using the compiler is a vector computer capable of vector computation and includes a vector element shift instruction. The vector element shift shifts the element of the vector register specified by Vy to the left by one element and stores the shifted element in the vector register specified by Vx as illustrated in 1. of FIG. 1, and stores the head element of the vector register specified by Vz in the last element of the vector register specified by Vx as illustrated in 2. of FIG. 1.

Thus, the compiler 100 generates the vector element shift in the vector element shift instruction generation means 22.

Operation of Example Embodiment

Figure 3:
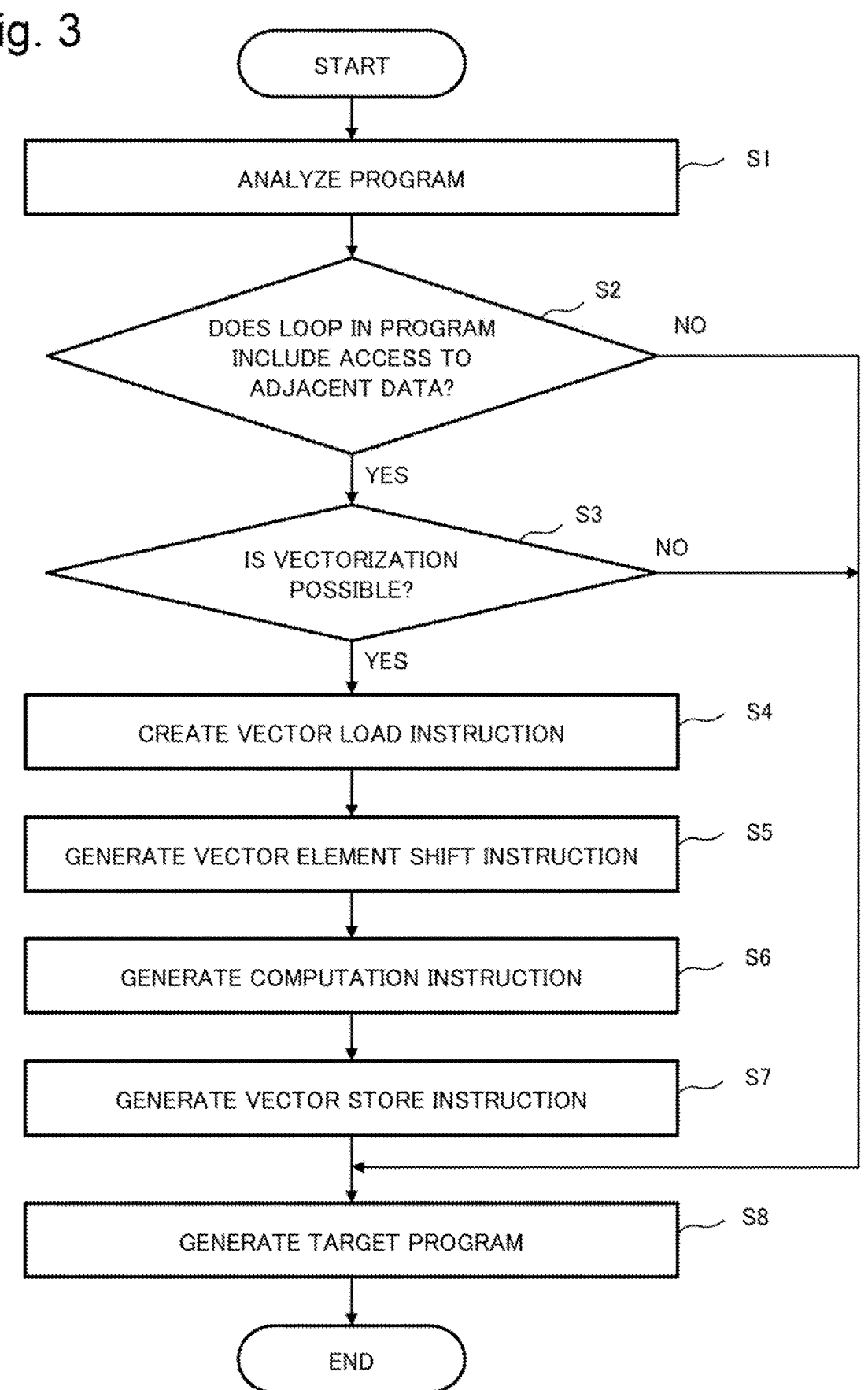
FIG. 3 is a flowchart for explaining a compiling method according to the first example embodiment of the present invention.
Figure 10:
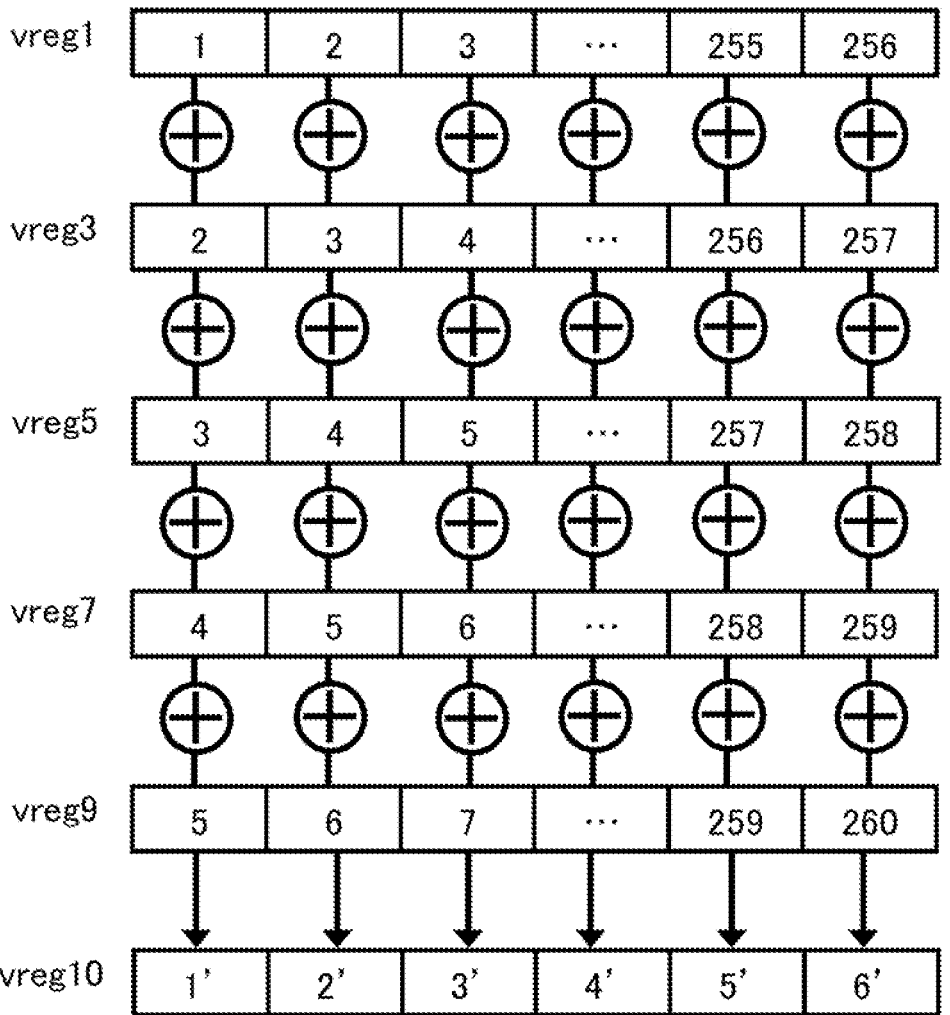
FIG. 10 is a conceptual diagram for explaining an operation of vector computation in the compiling method according to the first example embodiment of the present invention.
Figure 11:
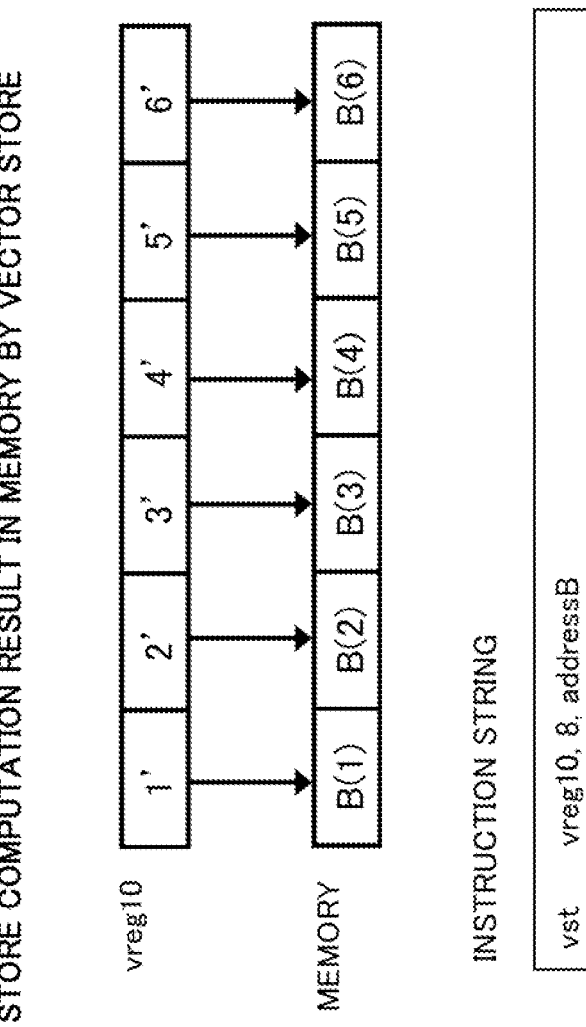
FIG. 11 is a conceptual diagram for explaining an operation of storing a computation result by a vector store in a memory in the compiling method according to the first example embodiment of the present invention.

Next, an operation will be described with reference to FIGS. 3 to 11. FIG. 3 is a flowchart for explaining the compiling method according to the first example embodiment of the present invention. FIG. 4 is an example of a source program targeted by the first example embodiment of the present invention. FIG. 5 is a conceptual diagram for explaining an operation of loading an element required for computation from a memory by vector loading in the compiling method according to the first example embodiment of the present invention. FIG. 6 is a conceptual diagram for explaining an operation of generating adjacent data A(I+1) by vector element shift in the compiling method according to the first example embodiment of the present invention. FIG. 7 is a conceptual diagram for explaining an operation of generating adjacent data A(I+2) by vector element shift in the compiling method according to the first example embodiment of the present invention. FIG. 8 is a conceptual diagram for explaining an operation of generating adjacent data A(I+3) by vector element shift in the compiling method according to the first example embodiment of the present invention. FIG. 9 is a conceptual diagram for explaining an operation of generating adjacent data A(I+4) by vector element shift in the compiling method according to the first example embodiment of the present invention. FIG. 10 is a conceptual diagram for explaining the operation of the vector computation in the compiling method according to the first example embodiment of the present invention. FIG. 11 is a conceptual diagram for explaining an operation of storing the computation result by the vector store in the memory in the compiling method according to the first example embodiment of the present invention.

In the present description, the number of elements of one vector register is 256. FIG. 4 illustrates a Fortran program having computation for adjacent data. The program of FIG. 4 is computation using the array elements A(I) to A(I+4), and is a program in which the difference between the values of the subscripts of the adjacent array elements is 1. As described later, the program to which the present invention can be applied is not limited to the program in which the difference between the values of the subscripts of the adjacent array elements is 1.

The target source program is analyzed (step S1). The adjacent data recognition means 11 recognizes whether the loop as illustrated in FIG. 4 includes an adjacent data access to the source program. In other words, the adjacent data recognition means 11 determines whether the loop in the source program includes access to adjacent data (step S2). When the loop in the source program does not include access to adjacent data (NO in step S2), the process proceeds to step S8.

When the loop in the source program includes access to adjacent data (YES in step S2), the process proceeds to step S3, and the vectorization determination means 12 determines whether vectorization is possible in the loop including the adjacent data access (step S3). As a condition under which vectorization can be performed, there is no dependency that inhibits vectorization in a definition/reference relationship of an array or a variable. When vectorization is not possible (NO in step S3), the process proceeds to step S8.

When the vectorization is possible (YES in step S3), the process proceeds to step S4, and the vectorization execution unit 20 vectorizes a loop that includes the adjacent data access and can be vectorized. The vectorization execution unit 20 generates an instruction string from the source program of FIG. 4 according to the procedure of FIGS. 5 to 11.

In the vectorization execution unit 20, a vector load instruction is generated by the vector load instruction generation means 21 in order to load data required for computation from the memory to the vector register. In the source program of FIG. 4, the maximum subscript of the sequence is I+4. Therefore, the number of elements of data used in one vector computation is vector length+4. Since the vector length of the loop in FIG. 4 is 256, as illustrated in FIG. 5, elements 1 to 256 of the array A are loaded into vreg1, and elements 257 to 260 of the array A are loaded into vreg2. vreg1 is a vector register having an element related to A(I).

After data is loaded into the vector register, the vector element shift instruction generation means 22 generates a vector register having an adjacent data element. The vector register having an adjacent data element is generated by the vector element shift instruction of FIG. 1.

In the present example embodiment, a vector register having an element related to A(I+1) can be generated as illustrated in (1) and (2) of FIG. 6 by using vreg1 and vreg2 as inputs of a vector element shift instruction. vreg3 is a vector register having an element related to A(I+1).

In order to generate a vector register having an element related to A(I+2), as shown in (1) of FIG. 7, vreg4 having a head element of 258 is first generated from vreg2 by a vector element shift instruction. Then, by using the previously generated vreg3 and vreg4 as inputs of a vector element shift instruction, it is possible to generate a vector register having an element related to A(I+2) as in (2) of FIG. 7 and (3) of FIG. 7. vreg5 is a vector register having an element related to A(I+2). The vector registers having the elements related to A(I+3) and A(I+4) can also be generated as (1) to (3) in FIG. 8 and (1) to (3) in FIG. 9 by executing two vector element shift instructions according to a procedure similar to A(I+2).

When a vector register having an adjacent element can be generated, computation is performed using the generated vector register as an input. The vector computation instruction generation means 23 generates the computation instruction as illustrated in FIG. 10 (step S6).

Finally, the computation result is stored in the memory by the vector store. The vector store instruction generation means 24 generates a vector store instruction as illustrated in FIG. 11 (step S7). The target program is generated by combining the determination result in step S2, the determination result in step S3, and the instructions generated in steps S4 to S7 (step S8).

Effects of Example Embodiment

According to the compiling device, the compiling method, and the compiling program of the present example embodiment, when a vector load instruction for loading adjacent data is included in the source program, the vector load instruction is replaced with a vector element shift instruction without memory access. Instructions without memory access are faster than instructions with memory access, such as vector load instructions. By replacing this vector load instruction with a vector element shift instruction without memory access, the number of executions of the vector load instruction can be reduced. As a result, the program can be speeded up.

FIG. 12A is an instruction string generated according to the background art, and FIG. 12B is an instruction string generated according to an example embodiment of the present invention. In the compiling method of the background art, at the time of vector computation on adjacent data, a vector load instruction is issued to each of the array elements A(I) to A(I+4), and all data used in the computation is read into a vector register by the vector load instruction as illustrated in FIG. 12A. On the other hand, in the compiling method of the example embodiment of the present invention, the vector load instruction is replaced with the vector element shift instruction without memory access at the time of the vector computation on the adjacent data. As a result, by generating the vector element shift instruction as illustrated in FIG. 12B, the number of executions of the vector load instruction can be reduced. By reducing the number of executions of the vector load instruction, access to the memory can be reduced, and the program can be speeded up.

Further, according to the compiling device, the compiling method, and the compiling program of the present example embodiment, the adjacent data elements are generated by the vector element shift instruction, and the computation can be executed without changing the vector length. As a result, the computation can be efficiently executed without reducing the vector length. The program recording medium in which the compiling program is recorded can also achieve effects similar to the effects described above.

Second Example Embodiment

Next, a compiling device, a compiling method, and a compiling program according to a second example embodiment of the present invention will be described. With respect to the compiling device, the compiling method, and the compiling program according to the present example embodiment, the detailed description of contents similar to those of the first example embodiment will be omitted, and differences will be described. In the first example embodiment described above, the program in which the difference between the values of the subscripts of the adjacent array elements is 1 has been described as an example, but the present invention is not limited thereto. For example, the present invention can also be applied to a program in which the difference between the values of the subscripts is larger than 1.

FIG. 13 is an example of a source program targeted by the second example embodiment of the present invention. FIG. 14 is a conceptual diagram for explaining the compiling method according to the second example embodiment of the present invention. The program of FIG. 13 is computation using the array elements A(I), A(I+3), A(I+4), A(I+7), and A(I+10), and is a program using the array elements in which the difference between the values of the subscripts of the adjacent array elements is 2 or more. In the present example embodiment, elements of the vector register specified by Vy are shifted to the left by the value of the register specified by Sx as illustrated in 1. of FIG. 14 and stored in the vector register specified by Vx, and Sx head elements of the vector register specified by Vz are stored in the last element of the vector register specified by Vx as illustrated in 2. of FIG. 14.

FIG. 14 illustrates a case where Sx=2. In FIG. 14, the vector register designated by Vy is shifted to the left by the value (Sx=2) of the register designated by Sx and is substituted into Vx. Further, Sx (Sx=2) head elements of the vector register designated by Vz are coupled to the last element of Vx.

For example, when the array element A(I+3) is generated from the array element A(I), the vector register specified by Vy is shifted to the left by the value (Sx=3) of the register specified by Sx and substituted into Vx. Further, the Sx head elements (Sx=3) of the vector register designated by Vz are combined with the last element of Vx. Similarly, leftward shift is performed by the value of the register designated by Sx associated to the difference between the values of the subscripts, and the shifted value is substituted into Vx, and the Sx head elements of the vector register designated by Vz are combined with the last element of Vx. In this manner, data can be similarly loaded for A(I+4), A(I+7), and A(I+10) by shifting to the left by the value of the register designated by Sx associated to the difference between the values of the subscripts and substituting the shifted value for Vx, and combining the Sx head elements of the vector register designated by Vz to the last element of Vx.

The compiling device, the compiling method, and the compiling program according to the present example embodiment can be applied as long as the vector computer capable of performing the vector computation has the vector element shift instruction capable of shifting a plurality of elements as illustrated in FIG. 14. Even if the vector computer does not have such an instruction, it can be applied by generating a multi-vector element shift instruction.

Effects of Example Embodiment

According to the compiling device, the compiling method, and the compiling program of the present example embodiment, similarly to the first example embodiment, when a vector load instruction for loading adjacent data is included in the source program, this vector load instruction is replaced with a vector element shift instruction without memory access. Instructions without memory access are faster than instructions with memory access, such as vector load instructions. By replacing this vector load instruction with a vector element shift instruction without memory access, the number of executions of the vector load instruction can be reduced. As a result, the program can be speeded up as in the first example embodiment.

Further, according to the compiling device, the compiling method, and the compiling program of the present example embodiment, the adjacent data elements are generated by the vector element shift instruction, and the computation can be executed without changing the vector length. As a result, the computation can be efficiently executed without reducing the vector length.

Further, according to the present example embodiment, even in a program in which the difference between the values of the subscripts of the adjacent array elements is two or more, when a vector load instruction for loading adjacent data is included in the source program, this vector load instruction can be replaced with a vector element shift instruction without memory access. As a result, the range of the target program that can be speeded up can be expanded. The program recording medium in which the compiling program is recorded can also achieve effects similar to the effects described above.

Third Example Embodiment

Next, a compiling device, a compiling method, and a compiling program according to a third example embodiment of the present invention will be described. With respect to the compiling device, the compiling method, and the compiling program according to the present example embodiment, the detailed description of contents similar to those of the first example embodiment will be omitted, and differences will be described. In the first example embodiment described above, the program in which the value increases when the difference between the values of the subscripts of the adjacent array elements is 1 has been described as an example, but the present invention is not limited thereto. For example, the present invention can also be applied to a case where the value of the subscript decreases.

FIG. 15 is an example of a source program targeted by the third example embodiment of the present invention. FIG. 16 is a conceptual diagram for explaining a compiling method according to the third example embodiment of the present invention. The program of FIG. 15 is computation using the array elements A(I), A(I−1), A(I−2), A(I−3), and A(I−4), and is a program using such an array element that the value of the subscript of an adjacent array element decreases. In the present example embodiment, the element of the vector register specified by Vy is shifted to the right by one element and stored in the vector register specified by Vx as illustrated in 1. of FIG. 16, and the head element of the vector register specified by Vz is combined with the head element of Vx as illustrated in 2. of FIG. 16.

For example, when the array element A(I−1) is generated from the array element A(I), the vector register specified by Vy is shifted to the right by one element and substituted into Vx. Further, the head element of the vector register specified by Vz is combined with the head element of Vx. Similarly, data can be similarly loaded for A(I−2), A(I−3), and A(I−4) by shifting to the right, substituting to Vx, and combining the head element of the vector register specified by Vz with the head element of Vx.

The compiling device, the compiling method, and the compiling program according to the present example embodiment can be applied as long as the vector computer capable of performing the vector computation has the vector element shift instruction in FIG. 16 in which the shift direction is inversed to that in FIG. 1. Even if the vector computer capable of vector computation does not have such an instruction, the present invention can also be applied by loading data with the array element A(I−4) as a base point instead of the array element A(I).

Effects of Example Embodiment

According to the compiling device, the compiling method, and the compiling program of the present example embodiment, similarly to the first example embodiment, when a vector load instruction for loading adjacent data is included in the source program, this vector load instruction is replaced with a vector element shift instruction without memory access. Instructions without memory access are faster than instructions with memory access, such as vector load instructions. By replacing this vector load instruction with a vector element shift instruction without memory access, the number of executions of the vector load instruction can be reduced. As a result, the program can be speeded up as in the first example embodiment.

Further, according to the compiling device, the compiling method, and the compiling program of the present example embodiment, the adjacent data elements are generated by the vector element shift instruction, and the computation can be executed without changing the vector length. As a result, the computation can be efficiently executed without reducing the vector length.

Further, according to the present example embodiment, even in a program using an array element in which the value of the subscript of an adjacent array element decreases, when a vector load instruction for loading adjacent data is included in the source program, this vector load instruction can be replaced with a vector element shift instruction without memory access. As a result, the range of the target program that can be speeded up can be expanded. The program recording medium in which the compiling program is recorded can also achieve effects similar to the effects described above.

Some or all of the above example embodiments may be described as the following Supplementary Notes, but are not limited to the following.

Supplementary Note 1

A compiling device includes: a loop analysis unit for determining whether vectorization of a loop in a source program is possible when an access to adjacent data is included in the loop; and a vectorization execution unit for generating an instruction for reading elements required for computation from a memory to a vector register when access to the adjacent data is included and the vectorization of the loop is possible.

Supplementary Note 2

The compiling device according to Supplementary Note 1, wherein
the vectorization execution unit includes:
a vector load instruction generation means configured to generate an instruction for reading an element required for computation from a memory to the vector register;
a vector element shift instruction generation means configured to generate vector data obtained by shifting an element read into the vector register;
a vector computation instruction generation means configured to generate a computation instruction for executing computation; and
a vector store instruction generation means configured to generate a vector store instruction for writing a computation result from the vector register to a memory.

Supplementary Note 3

The compiling device according to Supplementary Note 2, wherein
when a value of a subscript of an adjacent array element increases, the vector element shift instruction generation means shifts data of a specified first vector register to left by a number of increase of a value and substitutes the data into a second vector register, and further combines data from a head element of a next vector register to a tail by a same number as the number of increase.

Supplementary Note 4

The compiling device according to Supplementary Note 2, wherein
when a value of a subscript of an adjacent array element decreases, the vector element shift instruction generation means shifts data of a specified first vector register to right by a number of decrease of a value and substitutes the data into a second vector register, and further combines data from a head element of a next vector register to a head element by a same number as the number of decrease.

Supplementary Note 5

The compiling device according to any one of Supplementary Notes 1 to 4, wherein
the loop analysis unit includes:
an adjacent data recognition means configured to recognize whether access to adjacent data is included in a loop; and
a vectorization determination means configured to determine whether a loop including access to adjacent data is vectorizable.

Supplementary Note 6

A compiling method including:
when access to adjacent data is included in a loop of a source program, determining whether the loop can be vectorized;

generating a vector load instruction to read an element required for computation from a memory into a vector register when access to the adjacent data is included and the loop is vectorizable;
generating a vector element shift instruction that generates vector data obtained by shifting an element read into a vector register;
generating a vector computation instruction for executing computation; and
generating a vector store instruction to write a computation result from the vector register to a memory.

Supplementary Note 7

The compiling method according to Supplementary Note 6, wherein
when a value of a subscript of an adjacent array element increases, the vector element shift instruction shifts data of a specified first vector register to left by a number of increase of a value and substitutes the data into a second vector register, and further combines data from a head element of a next vector register to a tail by a same number as the number of increase.

Supplementary Note 8

The compiling method according to Supplementary Note 6, wherein
when a value of a subscript of an adjacent array element decreases, the vector element shift instruction shifts data of a specified first vector register to right by a number of decrease of a value and substitutes the data into a second vector register, and further combines data from a head element of a next vector register to a head element by a same number as the number of decrease.

Supplementary Note 9

A compiling program causing a computer to execute:
a loop analysis means configured to determine whether vectorization of a loop in a source program is possible when an access to adjacent data is included in the loop; and
a vectorization execution means configured to generate an instruction for reading an element required for computation from a memory to a vector register when access to the adjacent data is included and the vectorization of the loop is possible.

Supplementary Note 10

The compiling program according to Supplementary Note 9, wherein
the vectorization execution means includes:
a vector load instruction generation means configured to generate an instruction for reading an element required for computation from a memory to the vector register;
a vector element shift instruction generation means configured to generate vector data obtained by shifting an element read into the vector register;
a vector computation instruction generation means configured to generate a computation instruction for executing computation; and

a vector store instruction generation means configured to generate a vector store instruction for writing a computation result from the vector register to a memory.

Supplementary Note 11

The compiling program according to Supplementary Note 10, wherein when a value of a subscript of an adjacent array element increases, the vector element shift instruction generation means shifts data of a specified first vector register to left by a number of increase of a value and substitutes the data into a second vector register, and further combines data from a head element of a next vector register to a tail by a same number as the number of increase.

Supplementary Note 12

The compiling program according to Supplementary Note 10, wherein when a value of a subscript of an adjacent array element decreases, the vector element shift instruction generation means shifts data of a specified first vector register to right by a number of decrease of a value and substitutes the data into a second vector register, and further combines data from a head element of a next vector register to a head element by a same number as the number of decrease.

Supplementary Note 13

The compiling program according to any one of Supplementary Notes 9 to 12, wherein the loop analysis means includes:

an adjacent data recognition means configured to recognize whether access to adjacent data is included in a loop; and a vectorization determination means configured to determine whether a loop including access to adjacent data is vectorizable.

The present invention has been described above using the above-described example embodiments as schematic examples. However, the present invention is not limited to the above-described example embodiments. That is, the present invention can apply various aspects that can be understood by those of ordinary skill in the art without departing from the spirit and scope of the present invention.

This application is based upon and claims the benefit of priority from Japanese patent application No. 2020-206419, filed on Dec. 14, 2020, the disclosure of which is incorporated herein in its entirety by reference.

REFERENCE SIGNS LIST 10 loop analysis unit
11 adjacent data recognition means
12 vectorization determination means
20 vectorization execution unit
21 vector load instruction generation means
22 vector element shift instruction generation means
23 vector computation instruction generation means
24 vector store instruction generation means
100 compiler

14

What is claimed is:

1. A compiling device comprising:

at least one memory configured to store instructions; and at least one processor configured to execute the instructions to:

determine whether vectorization of a loop of a source program is possible when an access to adjacent data is included in the loop of the source program, generate a vector load instruction to read an element required for computation from a memory to a vector register when the access to the adjacent data is included in the loop of the source program and the vectorization of the loop of the source program is possible, generate a vector element shift instruction that generates vector data obtained by shifting an element read into the vector register, generate a vector computation instruction to execute a computation, generate a vector store instruction to write a computation result from the vector register to the memory, and execute the vector element shift instruction without reducing vector length, which provides efficient execution of the computation, wherein when a value of a subscript of an adjacent array element increases, the at least one processor shifts data of a specified first vector register to the left by an amount of the increase in the value of the subscript of the adjacent array element and substitutes the data of the specified first vector register into a second vector register, and further combines data from a head element of a next vector register to a tail element by a same amount as the amount of the increase in the value of the subscript of the adjacent array element.

2. The compiling device according to claim 1, wherein:

when a value of a subscript of an adjacent array element decreases, the at least one processor shifts data of a specified first vector register to the right by an amount of the decrease in the value of the subscript of the adjacent array element and substitutes the data of the specified first vector register into a second vector register, and further combines data from a head element of a next vector register to a head element by a same amount as the amount of the decrease in the value of the subscript of the adjacent array element.

3. The compiling device according to claim 2, wherein:

the at least one processor recognizes whether access to adjacent data is included in a loop, and determines whether a loop including access to adjacent data is vectorizable.

4. The compiling device according to claim 1, wherein:

the at least one processor recognizes whether access to adjacent data is included in a loop, and determines whether a loop including access to adjacent data is vectorizable.

5. A compiling method performed by a computer and comprising:

when access to adjacent data is included in a loop of a source program, determining whether the loop of the source program can be vectorized;

generating a vector load instruction to read an element required for computation from a memory to a vector register when the access to the adjacent data is included in the loop of the source program and the loop of the source program is vectorizable;

generating a vector element shift instruction that generates vector data obtained by shifting an element read into the vector register;

generating a vector computation instruction to execute a computation;

generating a vector store instruction to write a computation result from the vector register to the memory; and executing the vector element shift instruction without reducing vector length, which provides efficient execution of the computation, wherein when a value of a subscript of an adjacent array element increases, the vector element shift instruction shifts data of a specified first vector register to the left by an amount of the increase in the value of the subscript of the adjacent array element and substitutes the data of the specified first vector register into a second vector register, and further combines data from a head element of a next vector register to a tail element by a same amount as the amount of the increase in the value of the subscript of the adjacent array element.

6. The compiling method according to claim 5, wherein:

when a value of a subscript of an adjacent array element decreases, shifting data of a specified first vector register to the right by an amount of the decrease in the value of the subscript of the adjacent array element and substituting the data of the specified first vector register into a second vector register, and further combining data from a head element of a next vector register to a head element by a same amount as the amount of the decrease in the value of the subscript of the adjacent array element.

7. A non-transitory program recording medium storing a compiling program executable on a computer to perform processing comprising:

determining whether vectorization of a loop of a source program is possible when an access to adjacent data is included in the loop of the source program;

generating a vector load instruction to read an element required for computation from a memory to a vector register when the access to the adjacent data is included in the loop of the source program and the vectorization of the loop of the source program is possible;

generating a vector element shift instruction that generates vector data obtained by shifting an element read into the vector register;

generating a vector computation instruction to execute a computation;

generating a vector store instruction to write a computation result from the vector register to the memory; and executing the vector element shift instruction without reducing vector length, which provides efficient execution of the computation, wherein when a value of a subscript of an adjacent array element increases, the vector element shift instruction shifts data of a specified first vector register to the left by an amount of the increase in the value of the subscript of the adjacent array element and substitutes the data of the specified first vector register into a second vector register, and further combines data from a head element of a next vector register to a tail element by a same amount as the amount of the increase in the value of the subscript of the adjacent array element.

8. The non-transitory program recording medium according to claim 7, wherein the processing further comprises:

when a value of a subscript of an adjacent array element decreases, shifting data of a specified first vector register to the right by an amount of the decrease in the value of the subscript of the adjacent array element and substituting the data of the specified first vector register into a second vector register, and further combining data from a head element of a next vector register to a head element by a same amount as the amount of the decrease in the value of the subscript of the adjacent array element.

9. The non-transitory program recording medium according to claim 8, wherein the processing further comprises:

recognizing whether access to adjacent data is included in a loop; and determining whether a loop including access to adjacent data is vectorizable.

10. The non-transitory program recording medium according to claim 7, wherein the processing further comprises:

recognizing whether access to adjacent data is included in a loop; and determining whether a loop including access to adjacent data is vectorizable.

\* \* \* \* \*